3,075,829
PROCESS FOR MANUFACTURE OF
CARBON BLACK
Burton F. Latham, Jr., and Theodore A. Ruble, Amarillo,
Tex., assignors to Continental Carbon Company, Amarillo, Tex., a corporation of Delaware
Filed May 13, 1960, Ser. No. 29,054
5 Claims. (Cl. 23—209.4)

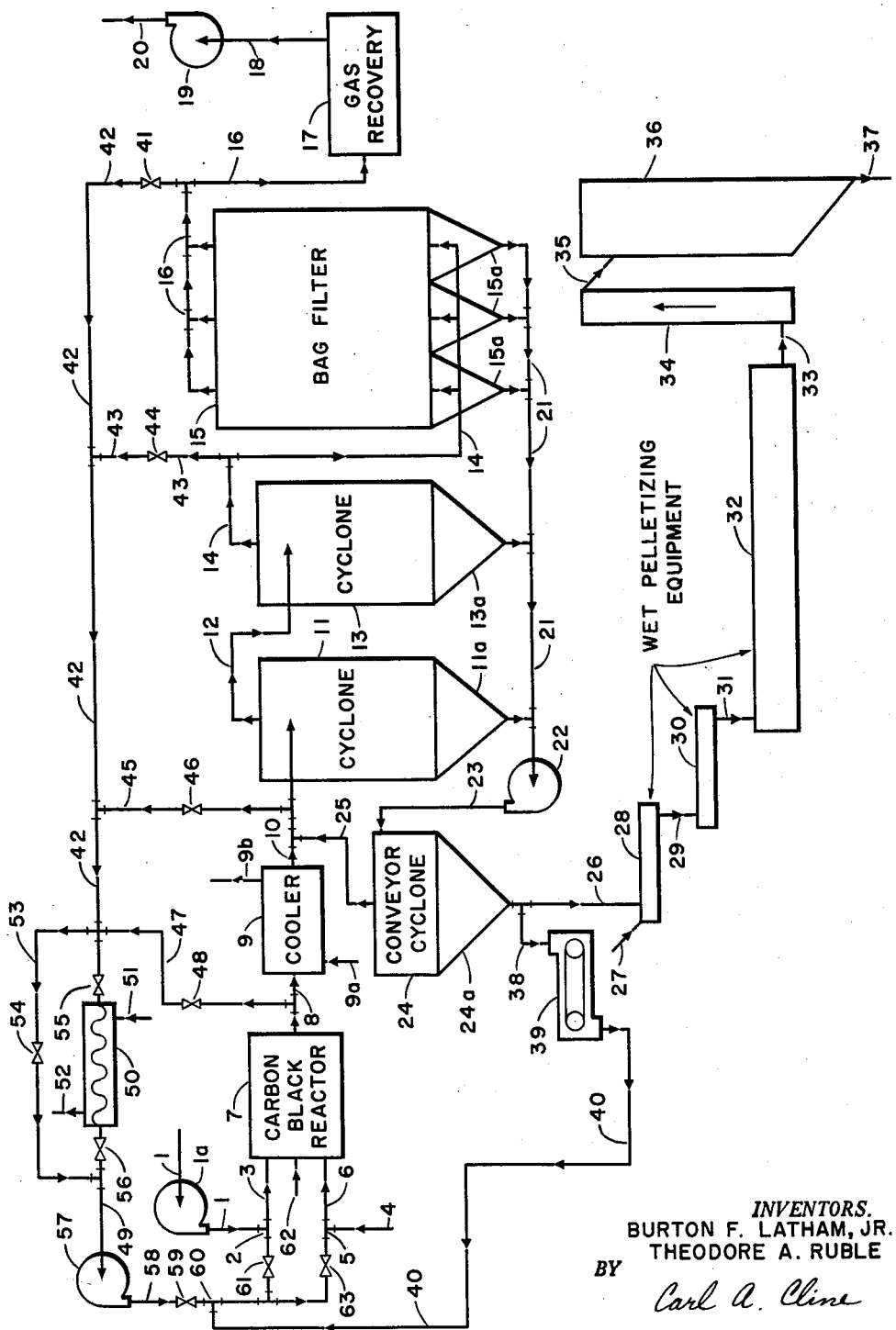

This invention relates to a furnace process for manufacturing carbon black from hydrocarbons. In another aspect it relates to an improved method of manufacturing carbon black that gives an increase in yield and to an improved method of controlling the quality of the carbon black. In the normal process for manufacture of carbon black by pyrolytic decomposition of hydrocarbons it is customary to produce the necessary high temperature conditions (2,400 to 2,600° F.) by combustion of a large volume of fuel gas, the hydrocarbon feed being then injected into a turbulent mass of hot combustion gases. The hydrocarbon feed, usually an oil of high carbon content, becomes completely vaporized upon contacting the hot gases and is then quickly decomposed. The high velocity of flow of the combustion gases and hydrocarbon vapor through the reactor results in very short residence time in the reactor. As a result, the pyrolytic reaction is usually far from complete and the yields obtained in ordinary commercial practice may leave much to be desired. It has been proposed to shorten the reaction time and possibly promote the reaction by incorporation of particles of carbon black within the oil used as the feed stream. This proposal has been based on the supposition that the small solid particles would form nuclei which would promote the pyrolysis in a beneficial manner. However, the carbon particles undergo heating in the presence of the oil, so that pyrolytic decomposition of the oil may occur on the surface of the particles during the time when the oil would normally be changing from the liquid into the vapor phase. As a result, such a process is difficult to control and does not always yield a type of carbon black which is particularly desirable for rubber reinforcement.

It is an object of this invention to produce incandescent particles of the carbon in the combustion gas stream in the reactor prior to contact with the hydrocarbon oil feedstock so as to obviate difficulties inherent in prior art processes.

It is a further object of this invention to provide a process for manufacture of carbon black which will promote recycling of the product gas from the carbon black reactor with greatly increased economy in heat and in consumption of fuel gas. It is still a further object of this invention to provide a process for manufacture of carbon black in which the use of secondary carbon recovery devices, such as scrubbers and bag filters, is minimized. It is also an object of this invention to provide a process capable of yielding carbon black of small particle size and possessing a narrow distribution of particle size.

Briefly, we have discovered that carbon black can be manufactured more efficiently, in better yields, and with better control of particle size by inclusion of carbon particles in the hot combustion gases by initially adding suspended carbon black to at least one of the streams selected from the group consisting of the fuel gas stream and the combustion-supporting gas stream.

The carrying out of the method of this invention may be accomplished in a variety of ways which will become evident upon reading the description of the process which follows. The process consists of the following steps:

(1) Subdividing a portion of the stream of loose carbon black from the collecting system and before it is pelletized from the main carbon black production stream and/or recycling a portion of the effluent gas stream containing carbon black.

(2) Introducing the above side stream of loose carbon black or loose carbon black and effluent gas into the combustion air and/or fuel gas that is being introduced into said carbon black reactor for cracking heat.

In step 1, a weighing belt, or similar solid flow device, is used to divide a constant flow stream of loose black from the production stream to be recycled to the carbon black reactor. A constant recycle stream of effluent gas, with suspended carbon black, can be separated at different points from the carbon black collecting system and this effluent gas can be recycled to the carbon black reactor. Either of these methods, or a combination of both methods, can be used to recycle carbon black to the carbon black reactor. The recycle carbon black, which may consist of from about 1 to about 50 percent of the production stream, can be introduced into the reactor in either the combustion air or gas, or in both of these gas streams. This black remains in suspension in the fast moving combustion air or natural gas stream as an aerosol, and is thus recycled to the reactor combustion zone. When the finely divided carbon particles strike the combustion zone they are heated to white heat (2400° to 2600° F.), and this heat is radiated directly to the make oil (or make gas in the case of gas black reactor). Thus, the recycled carbon particles serve as a heat exchange medium which helps speed up the initial cracking action of the make hydrocarbon to carbon black.

When a relatively large percentage of carbon black is recycled to the combustion zone, the excess carbon particles introduced serve as nuclei for building up larger carbon particles. Thus, the average particle size of the product black can be controlled by the amount of the recycle black used.

Recycling part of the effluent gas containing hydrogen and carbon monoxide can furnish part of the combustion heat for cracking and thus cut down on the use of natural gas.

Referring to the FIGURE, a description of the flow of the various process streams through the carbon black recycle system are outlined as follows:

*Gas Flow Through Carbon Black Reactor and Collecting System*

Starting at the carbon black reactor 7 the combustion-supporting gas, usually air, 1 is moved by the blower 1-a into T connection 2 and then through line 3 into carbon black reactor 7. The natural gas is fed through line 4 into T connection 5 and then through line 6 into carbon black reactor. The feedstock oil is fed through line 62 and then discharged through an oil spray into the carbon black reactor. Each of these feed streams (air, gas, and oil) to carbon black reactor 7 is measured and controlled carefully by proper flow control instrumentation so that reducing conditions exist with a large excess of hydrocarbons being introduced. In oil black reactors, enough gas is added with the air to consume most of the oxygen and to generate enough heat to crack most of the oil into carbon black and hydrogen. In gas black reactors no oil is used and a large excess of natural gas is added to the reactor. Part of the natural gas combines with the oxygen in the air, burning to carbon-dioxide, carbon monoxide, and water vapor, furnishing enough heat to crack the remaining natural gas to carbon black and hydrogen.

The hot effluent gas and suspended carbon black flow through refractory connection 8 into cooler 9, which consists of a quench chamber into which quench water is sprayed and cools effluent gas by evaporation, or a heat exchanger which cools the effluent gas through a heat exchange surface. In the second case, the cooling fluid, usually air, is added at 9–a and leaves at 9–b as hot air which can be used as a source of process heat to pre-heat the oil, gas, or air to the reactor or to dry wet pelletized carbon black. The cooled effluent gas (approximately 500° F.) leaves the cooler 9 by duct 10 and enters a series of two or more cyclones 11 and 13 connected by connecting ducts 10, 12, and 14. Most of the carbon black is removed from the gas stream in these cyclones. The effluent gas then passes through duct 14 into the bag filter 15 where all the remaining carbon black is removed from the gas stream.

*Gas Recovery System*

The clean effluent gas leaves the bag filter and passes through duct 16 to hydrogen recovery 17. Here the water vapor is first condensed out and the hydrogen then separated by a series of gas diffusion membrane cells or by other methods. The carbon dioxide can also be separated out by scrubbing with monoethanolamine and then carbon monoxide can be separated by similar scrubbing methods. This leaves practically pure nitrogen in the tail gas. The nitrogen and the hydrogen by-product gas stream can be used to produce ammonia while the hydrogen and carbon monoxide can be used to produce by-product methyl alcohol with the aid of a catalyst. Purified hydrogen, carbon dioxide, and nitrogen can be compressed and sold as bottled gas. Approximately ½ to 1 percent acetylene is present in most effluent gases from carbon black reactors. This gas can also be separated by scrubbing methods. The induced draft fan 19 pulls any remaining tail gas through duct 18 and discharges it through stack 20. This fan can also be located in duct 16 between the bag filter 15 and the gas recovery system 17.

*Carbon Black and Effluent Gas Recycle*

Effluent gas containing suspended carbon black can be recycled from one or more of the following sources to the carbon black reactor as follows:

(1) The stream from duct 8 between carbon black reactor 7 and cooler 9 is recycled through valve 48 and line 47 to recycle line 42. This hot effluent gas is relatively low in water vapor content and high in suspended carbon black.

(2) The stream from duct 10 between cooler 9 and cyclone 11 is recycled through valve 46 and line 45 to recycle line 42. This effluent gas recycle is a lot cooler than in (1) but contains much higher percent water vapor if a water quench is used in cooler 9. The percent water vapor at this point remains relatively low if a heat exchange cooler is used. This recycle remains high in suspended carbon black concentration.

(3) The stream from duct 14 between cyclone 13 and bag filter 15 is recycled through valve 44 and line 43 to recycle line 42. This effluent gas has the same composition as under (2) above, except the carbon black concentration is lower. If two cyclones in series are used, the carbon black concentration is only about 45 percent (the maximum). If four series cyclones are used, the concentration is reduced to approximately 20 percent. Thus, almost any desired concentration of suspended carbon black in this range can be obtained by having the recycle after the proper cyclone.

(4) The stream from duct 16 between bag filter 15 and gas recovery unit 17 is recycled through valve 41 to gas recycle line 42. This effluent gas recycle is the same as under (2) and (3), except all the suspended carbon black has been removed.

The recycle effluent gas and suspended carbon black, as outlined under (1), (2), (3), and (4) above, is recycled from one or more of these sources through recycle line 42, valve 55, condenser 50, valve 56, to connecting line 49 to recycle fan 57. The condenser heat exchanger 50 is used to condense most of the water vapor out of recycle gas and is either water- or air-cooled by the cooling fluid added at 51 and exhausted at 52. If it is not desirable to condense the water out of effluent gas streams, valves 55 and 56 are shut and bypass valve 54 is open to allow effluent gas to pass through bypass line 53.

The effluent gas from recycle fan 57 passes through line 58, valve 59, and T connection 60. From T 60 the recycled effluent gas can be mixed with combustion air by valve 61 or with natural gas through valve 63. In order to utilize more efficiently the fuel value of the recycled effluent gas, oxygen may be used as the combustion-supporting gas.

If the carbon black concentration is not high enough in the effluent recycled gas, a weighing belt 39 can be used to recycle a desired weighed flow of loose carbon black from settling tank 24 through line 38 to loose carbon black recycle conveyor 40. This loose carbon black is mixed in mixing T connection 60 with the recycle effluent gas and its suspended carbon black. The loose carbon black recycle can also be used without any recycle effluent gas.

*Carbon Black Production and Processing Flow*

Part of the effluent gas, plus the carbon black caught in the bag filter, flows out the bottom of bag filter hoppers 15–a into pneumatic conveyor 21. This effluent conveyor gas passes under cones 13–a and 11–a of the cyclones where the remainder of the carbon black production is picked up by this gas stream and carried into conveyor cyclone 24 (settling tank) where the black is separated from the effluent gas stream which is returned to the primary cyclone through pneumatic return line 25 and duct 10. The loose black production is fed out of the bottom of the settling tank cone 24–a into line 26, which carries the black to the wet pelletizing equipment. A pulverizing unit can be used in this line to grind up any grit particles. The loose black is fed from line 26 into the first stage of carbon black pelletizing box 28 where it is mixed with water added at 27. The pins in this stage of the mixing box first mix the black with the water and then whip the mixture into small spherical shaped wet pellets. The wet pellets then drop through gravity connection 29 into the second stage 30 of the mixing box where the pins on a shaft turn more slowly to polish the wet pellets. These wet pellets then drop through gravity chute 31 into dry drum 32, through which hot gases are being circulated to dry the wet pellets. The dried pellets then drop from drying drum 32 through line 33 into the elevator 34 where they are raised up and dropped through connection 35 into the carbon black storage tank 36. The pellets are loaded from storage tank 36 through line 37 directly into hopper cars or packed direct, for example, into 50-pound paper bags.

Other modifications and variations besides those described in the foregoing may be resorted to by those skilled in the art without departing from the spirit and scope of this invention. Such modifications and variations are considered to be within the scope purview of the appended claims.

We claim:

1. A process for producing carbon black comprising the steps of burning a fuel gas stream in a combustion-supporting stream to produce hot combustion gases, pyrolytically converting a feed stream consisting essentially of hydrocarbon, into carbon black and gas by contacting said feed in a vaporous state with said hot combustion gases thereby producing an effluent gas stream containing suspended carbon black, recycling to the reactor combustion zone a measured quantity consisting of from about 1 to about 50 percent of said carbon black in suspension in at least one of said gas streams and recovering the remainder of said carbon black.

2. A process according to claim 1, in which collected carbon black product is recyled in suspension in the combustion-supporting gas stream, said combustion-supporting gas stream consisting essentially of air.

3. A process according to claim 1, in which an effluent gas stream containing suspended carbon black is recycled in the fuel gas stream and the combustion-supporting gas consists essentially of oxygen.

4. A process according to claim 1, in which a part of the carbon black reactor effluent gas stream is recycled in at least one of the gaseous feed streams.

5. In a process for producing carbon black in which a fuel gas stream and a combustion-supporting gas stream are injected into a reactor to produce therein hot combustion gases and a liquid hydrocarbon feed stream is vaporized and contacted with said hot combustion gases to produce an effluent gas stream containing suspended carbon black, followed by recovery of said carbon black from said effluent gas stream, the improvement consisting of introducing into the reactor, in suspension in at least one of said gas streams, a measured quantity of carbon black consisting of from about 1 to about 50 percent of the quantity suspended in said effluent gas stream, thereby producing luminous carbon particles in suspension in said hot combustion gases.

References Cited in the file of this patent

UNITED STATES PATENTS

| | | |
|---|---|---|
| 2,346,754 | Hemminger | Apr. 18, 1944 |
| 2,672,402 | Stokes | Mar. 16, 1954 |
| 2,746,564 | Williams | May 22, 1956 |
| 2,867,508 | Wood et al. | Jan. 6, 1959 |